(12) United States Patent  (10) Patent No.: US 7,447,010 B2
Chen  (45) Date of Patent: Nov. 4, 2008

(54) SUPPORTING MECHANISM FOR STORAGE DRIVES

(75) Inventor: Kuei-Hua Chen, Taipei (TW)

(73) Assignee: Inventec Corporation, Taipei (TW)

( * ) Notice: Subject to any disclaimer, the term of this patent is extended or adjusted under 35 U.S.C. 154(b) by 545 days.

(21) Appl. No.: 11/190,928

(22) Filed: Jul. 28, 2005

(65) Prior Publication Data

US 2007/0025067 A1 Feb. 1, 2007

(51) Int. Cl.
*G06F 1/16* (2006.01)
(52) U.S. Cl. ........................... 361/685; 720/639
(58) Field of Classification Search ................ 361/679, 361/685; 720/639
See application file for complete search history.

(56) References Cited

U.S. PATENT DOCUMENTS

| | | | | |
|---|---|---|---|---|
| 5,340,340 A * | 8/1994 | Hastings et al. | ............... | 439/64 |
| 6,282,085 B1 * | 8/2001 | Chao et al. | ................... | 361/683 |
| 6,341,059 B1 * | 1/2002 | Kohler et al. | ............... | 361/685 |
| 6,377,446 B1 * | 4/2002 | Liau | ............... | 361/683 |
| 6,452,792 B1 * | 9/2002 | Chen | ............... | 361/685 |
| 6,477,042 B1 * | 11/2002 | Allgeyer et al. | ............. | 361/685 |
| 6,529,373 B1 * | 3/2003 | Liao et al. | ................... | 361/685 |
| 6,590,766 B2 * | 7/2003 | Sheng-Hsiung et al. | ..... | 361/685 |
| 6,625,014 B1 * | 9/2003 | Tucker et al. | ............... | 361/685 |
| 6,657,868 B1 * | 12/2003 | Hsue | ............... | 361/728 |
| 6,768,638 B2 * | 7/2004 | Shih | ............... | 361/685 |
| 6,954,940 B2 * | 10/2005 | Hsu | ............... | 720/639 |
| 7,038,907 B2 * | 5/2006 | Chen | ............... | 361/685 |
| 7,092,251 B1 * | 8/2006 | Henry | ............... | 361/685 |
| 7,102,886 B2 * | 9/2006 | Peng et al. | ............... | 361/685 |
| 7,130,187 B1 * | 10/2006 | Sun | ............... | 361/685 |
| 7,149,081 B2 * | 12/2006 | Chen et al. | ............... | 361/685 |
| 7,259,959 B2 * | 8/2007 | Tu et al. | ............... | 361/685 |

\* cited by examiner

*Primary Examiner*—Lisa Lea-Edmonds
(74) *Attorney, Agent, or Firm*—Muncy, Geissler, Olds & Lowe, PLLC

(57) ABSTRACT

A supporting mechanism for storage drives is disclosed that includes a plurality of fixing components disposed on the sides of a case of an electronic device. Fixing slots corresponding to the fixing components are located on the case. A supporting element is disposed on the center region of the case and a through hole corresponding to the supporting element is located at the center region of the frame. The fixing components are fixed in the fixing slots, the supporting element penetrates the through hole, and the frame is fastened on the supporting element by a screwing component. Thus, the frame is not detached easily due to vibration or shaking. The fixing pieces are disposed on the sides of the frame and make the frame easily attachable and detachable.

7 Claims, 6 Drawing Sheets

SUPPORTING MECHANISM FOR STORAGE DRIVES

FIELD OF THE INVENTION

The present invention relates to a supporting mechanism for storage drives, and more particularly, to a supporting mechanism for storage drives which is easily attached and detached from a case.

DESCRIPTION OF THE PRIOR ART

The storage demands for personal computers are continually increasing. In order to solve the problem that a storage drive does not have enough storage capacity, the use of more than one drive has become a common solution.

In the conventional supporting mechanism for a storage drive, such as a hard drive, the storage drive is fixed to the PC case by riveting or screwing. Riveting is a method that involves the storage drive being riveted to the PC case and it can not be readily detached. Screwing is a method that involves the storage drive being fixed to the PC case by several screws such that it can be detached. However, the method of attaching and detaching a storage drive by screws involves having to screw or unscrew the screws using tools. This necessity costs labor and time and can slow down the working process. Moreover, screws that are used for a long time have the problems of rusting or having the thread deteriorate.

In order to solve the above problems, a conventional supporting mechanism for a storage drive is proposed as in FIG. 7. A supporting pivot 43 disposed on one side of a PC case 40, and an end of a pivoting frame 41 is disposed on the supporting pivot 43. A clipping unit 42 is disposed on another side of the mainframe case 40 corresponding to the rotating pivot 43.

When a hard disk drive is installed in the PC case 40, the pivoting frame 41 is pivoted downward via the pivoting pivot 43, and a latch on the other end of the pivoting frame 41 is fixed in the clipping unit 42. Thus the pivoting frame 41 is fixed to the PC case 40 in order to install the hard disk drive in the PC case 40. However, the structure of the pivoting frame 41 is complicated and the design occupies considerable space. Furthermore, the weight of the pivoting frame 41 is supported by the supporting pivot 43 and the clipping unit 42, and this allows for excessive vibration.

SUMMARY OF THE INVENTION

In order to solve the problems of the prior art, a primary objective of the present invention is to provide a supporting mechanism for a hard disk drive which has a simple structure, good stability, and is easily attached and detached.

In order to achieve the above objectives, the present invention provides a supporting mechanism for a hard disk drive disposed on a case of an electronic device. The supporting mechanism includes a plurality of fixing components disposed on the case and a frame with a plurality of fixing slots corresponding to the fixing components. A supporting element is disposed on a center region of the case and a through hole is located on the center region of the frame. The supporting element can penetrate the through hole, and the frame is fixed on the supporting element by a screwing component. As a result, the frame is not easily detached by vibration. Two fixing pieces are disposed on two sides of the frame respectively. The fixing pieces may be a resilient component such that the frame is attached and detached easily. The resilient component may include a blocking sheet that prevents the frame from moving upwards and downwards.

When the frame is attached to the case, the fixing slots on the frame are aimed at the fixing components and the supporting element is aimed at the through hole. Then, the frame is disposed in the case such that the supporting element penetrates the through hole. While the fixing components are being positioned in the fixing slots, the fixing component pushes the fixing piece having the blocking sheet and then is fixed by the blocking sheet. Thus, the frame is fixed to the case. Afterwards, the screwing component, which may be a thumbscrew, is used to fasten the frame and the supporting element. In the case of a thumbscrew, the frame can be screwed and fastened by hand such that the frame is not easily detached due to vibration. As such, the fixing components and the screwing component can be operated by hand and the actions are more convenient.

If the frame is detached, first the screwing component is unscrewed by hand. Then the fixing pieces can be pulled and moved upwards by hand since they are resilient components. Thus, the fixing components are detached from the fixing slots and the frame can be removed from the case. Subsequently, optical, hard disk, or floppy disk drives on the frame can be replaced or accessed.

The supporting mechanism for a hard disk drive of present invention includes a plurality of fixing components disposed on a frame and a case with a plurality of fixing slots corresponding to the fixing components, thereby allowing the frame to be fixed to the case. A supporting element disposed on a center region of the case and the frame is screwed with the supporting element by a screwing component. The structure of the aforesaid supporting mechanism is simple and is operated by hand easily. Being small, the fixing components and pieces of the supporting mechanism occupy only a small volume, and, when disposed on the frame and the case respectively, do not unduly restrict space usage.

BRIEF DESCRIPTION OF THE DRAWINGS

A better understanding of the present invention can be obtained when the forgoing detailed description is considered in conjunction with the following drawings, in which.

DETAILED DESCRIPTION OF THE PREFFERED EMBODIMENT

The descriptions below of specific embodiments are to illustrate the present invention. Others skilled in the art can easily understand other advantages and features of the present invention from the contents disclosed in this specification. The present invention can be carried out or applied through different embodiments. The details of this specification can be modified based on different viewpoints and applications yet still fall within the scope of the present invention.

Figure 1:
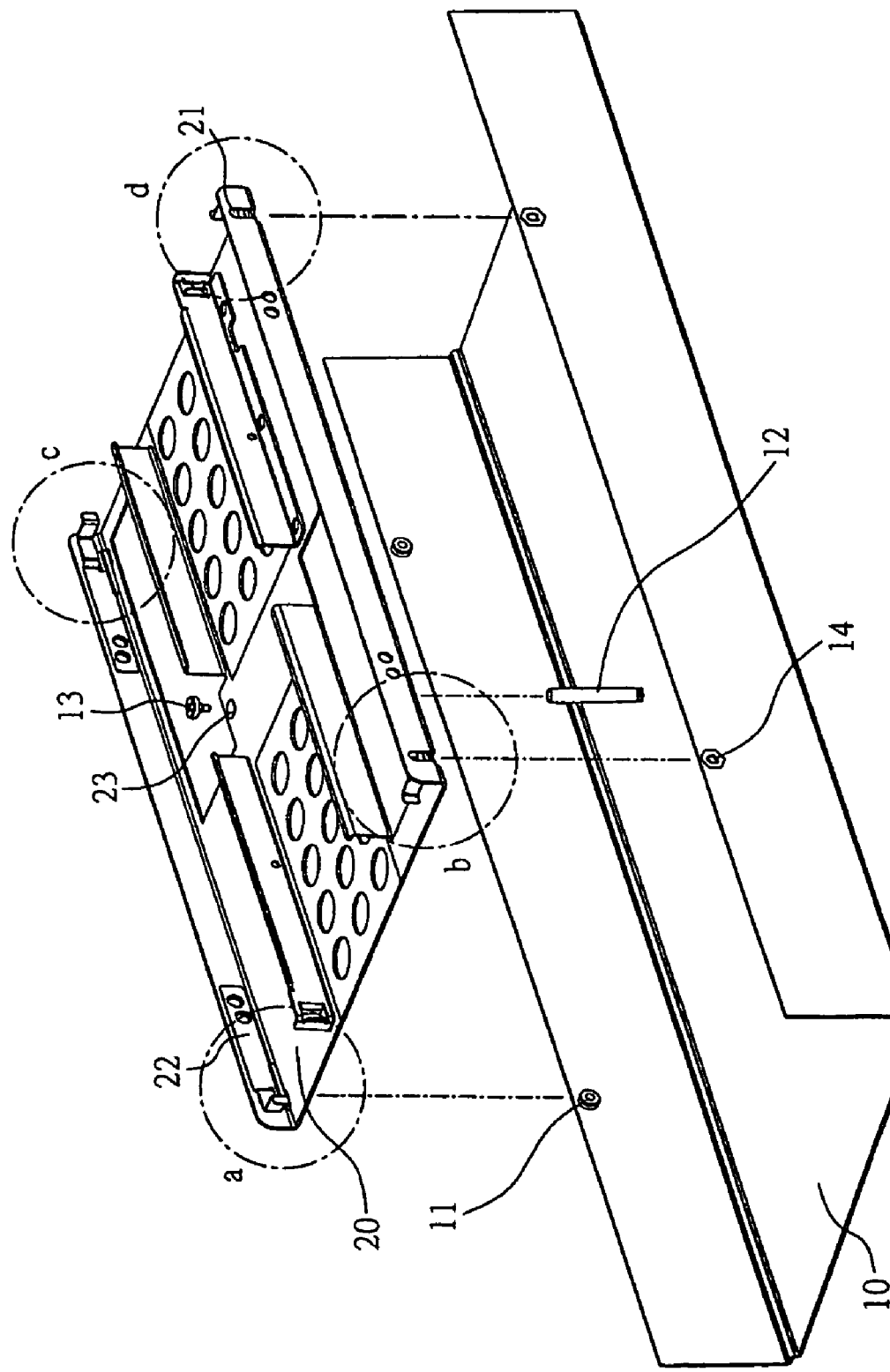
FIG. 1 is a structural drawing of a support mechanism for storage drives of the present invention.

Referring to FIG. 1, a schematic diagram for a supporting mechanism for a hard disk drive of the present invention is shown. Four fixing components 11, which may be axial fixing components, are disposed on the case 10 of the electronic device. The case 10 may also be the motherboard of a computer if the storage drives are directly disposed on the motherboard.

Figure 4:
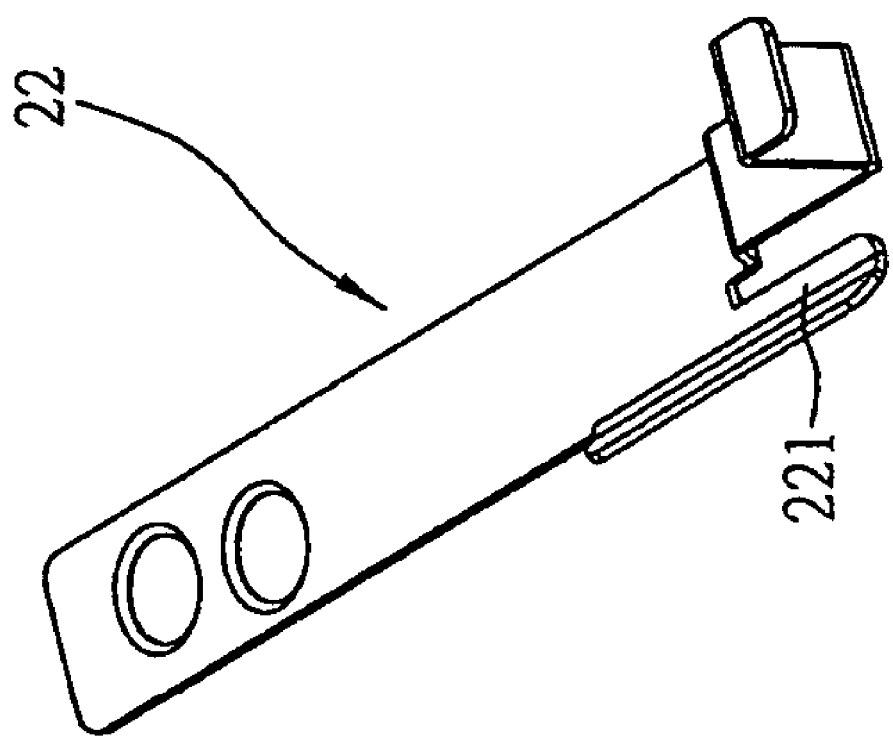
FIG. 4 is a close-up structural drawing of the sheet spring of FIGS. 1-3.

The fixing components 11 are secured with fasteners such as nuts 14. Both sides of a frame 20 have fixing slots 21 corresponding to the fixing components disposed thereon. A supporting element 12 is disposed on the center region of the case 10 and a through hole 23 is located on the center region of the frame 20 corresponding to the supporting element 12. The supporting element 12 penetrates the through hole 23, and the frame 20 is fixed on the case by a screwing component 13 penetrating the through hole 23, thereby preventing the frame 20 from detaching from the case 10 as a consequence of vibration. The screwing component 13 may be a thumbscrew. Fixing pieces 22 are disposed on the both side of the frame 20 respectively and make the frame 20 easily attachable or detachable. The fixing pieces 22 can be resilient components, such as sheet springs. As shown in FIG. 4, each sheet spring 22 has a blocking sheet 221. The blocking sheet 221 positions under the fixing component 11 and prevents the frame from moving upwards.

When the frame 20 needs to be attached on the case 10, the fixing slots 21 on the frame 20 are aligned with the fixing components 11 and the supporting element 12 is aligned with the through hole 23. Then, as the frame 20 is being disposed in the case 10, the supporting element 12 penetrates the through hole 23. As the fixing components 11 are fixed in the fixing slots 21, the fixing component 11 pushes the fixing piece 22 having the blocking sheet 221, such that the frame is fixed by the blocking sheet 221 thereunder. Thus, the frame 20 is fixed on the case 10 and does not move upwards because of vibration. Afterwards, the screwing component 13, which is used to fasten the frame 20 and the supporting element 12, is screwed. The screwing component 13 may be a thumbscrew such that the frame 20 is screwed and fastened on the supporting element 12 by hand in order to prevent the frame 20 from detaching from the case 10 due to vibration. As a result, the frame 20 is fixed on the case 10 by the fixing components 11 and the screwing component 13, and storage drives are readily disposed on the frame 20, enhancing user convenience.

If the frame 20 needs to be detached, first the screwing component 13 is unscrewed from the supporting element 12, typically by hand, and the screwing component 13 is removed. Then the fixing pieces 22 (as shown in circles a, b, c and d of FIG. 1) can be pulled and moved upwards by hand since they are resilient components. Thus, the fixing components 11 are detached from the fixing slots 21 and the frame 20 can be removed from the case 10. At this time, storage drives on the frame 20 can be replaced or accessed.

Figure 2:
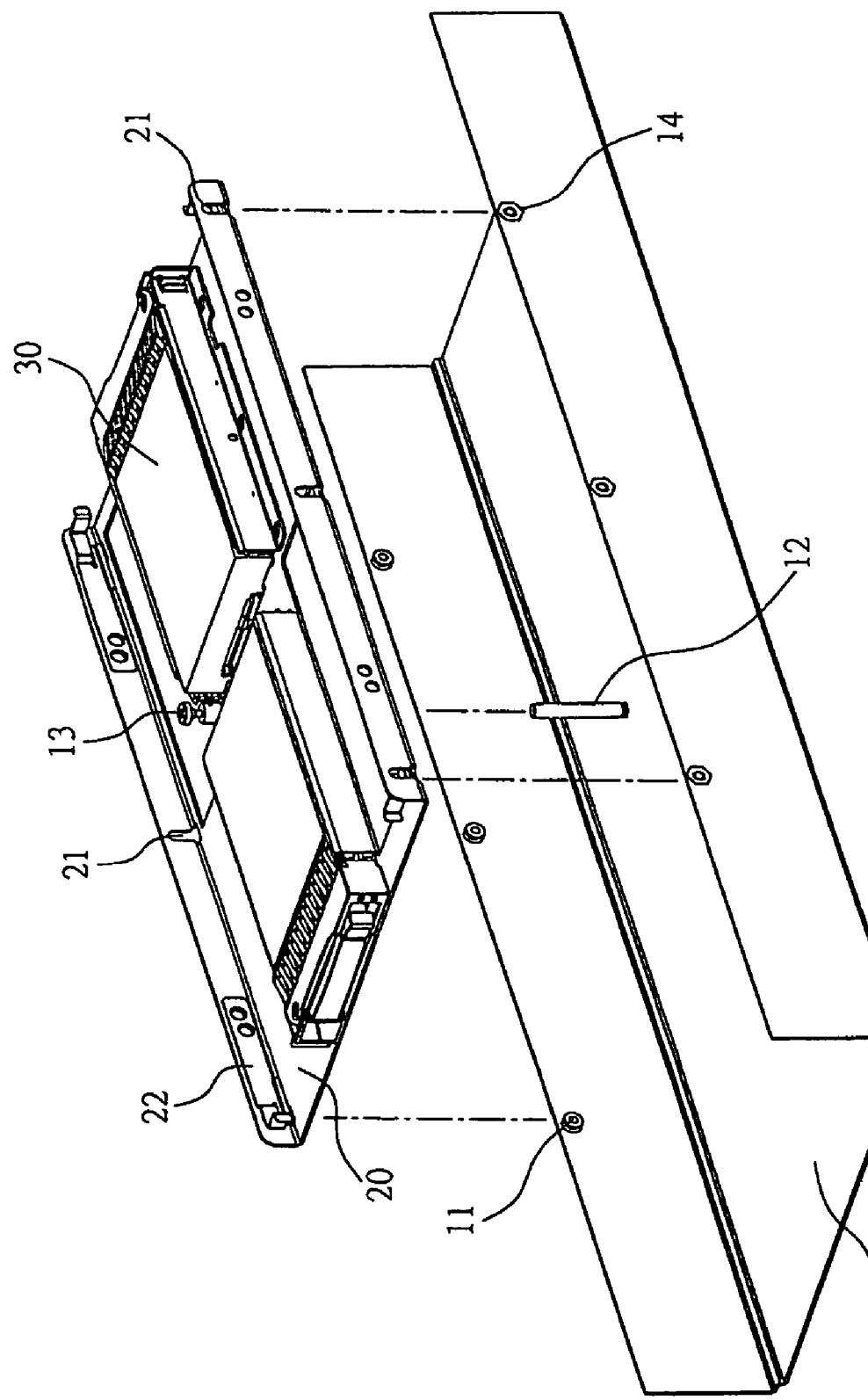
FIG. 2 is a structural drawing of a support mechanism for storage drives according to an embodiment of the present invention.
Figure 3:
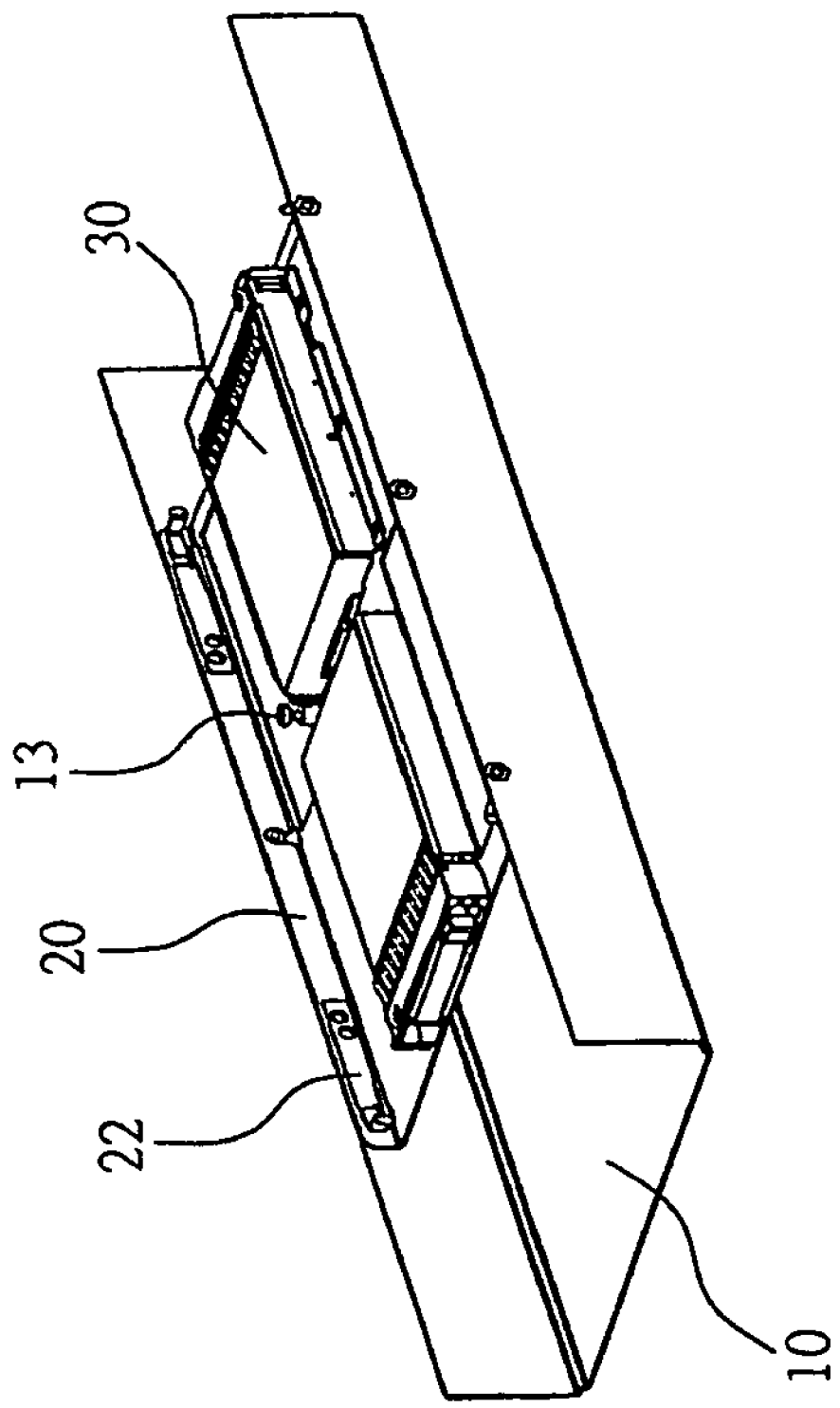
FIG. 3 is a structural drawing of a support mechanism for storage drives according to an embodiment of the present invention.

Additionally, for expressing the structure of the supporting mechanism for storage drives of the present invention, FIG. 2 and FIG. 3 illustrate the present invention with storage drives attached. Six fixing components 11, which can be axial fixing components, are disposed on a case 10. The fixing components 11 can be screwed and fastened on the case 10 by nuts 14. Fixing slots 21 are located on the frame 20, corresponding to the fixing components 11. One or more storage drives, such as a hard disk drive 30, can be disposed on the frame 20. A supporting element 12 is disposed on the center region of the case 10, and a through hole 23 is located on the frame 20 corresponding to the supporting element 12. Fixing pieces 22 are disposed on two sides of the frame 20 respectively. Each fixing piece 22 can be a sheet spring having a blocking sheet 221 (as shown in FIG. 4). Because the fixing piece 22 can be a resilient component, the frame 20 can be attached and detached easily.

If the frame 20 with the storage drive 30 thereon is attached to the case 10, the six fixing slots 21 on the frame 20 are aligned with the six fixing components 11 on the case 10 and the supporting element 12 is aligned with the through hole on the frame 20. Then, as the frame 20 is disposed in the case 10, the supporting element 12 penetrates the through hole and the fixing components 11 are fixed in the fixing slots 21. While the fixing components 11 are fixed in the fixing slots 21, the fixing components 11 push the fixing pieces 22. In that the blocking sheets 221 on the fixing pieces 22 are resilient components, the fixing components 11 are fixed by the blocking sheets 221 thereof. Thus, the frame 20 is fixed on the case 10 and does not move upwards due to vibration. Additionally, after the frame 20 is fixed on the case 10, a screwing component 13 is used to fasten the frame 20 and the supporting element 12. The screwing component 13 may be a thumbscrew that can be screwed by hand in order to fix the frame on the case 10. That is, the frame 20 is not easily detached from the case 10 due to vibration or shaking. Moreover, the storage drives are readily disposed on the frame 20, and then the frame 20 is readily disposed in the case 10.

If the frame 20 needs to be detached from the case 10, first, the screwing component 13 is unscrewed from the supporting element 12 and the screwing component 13 is removed. Then, the fixing pieces 22 (as shown in circles a, b, c and d of FIG. 1) can be pulled and moved upwards by hand since they are resilient components. Thus, the fixing components 11 are detached from the fixing slots 21, and the frame 20 can be removed from the case 10. Thereafter, the storage drives on the frame 20 can be replaced or accessed.

Figure 5:
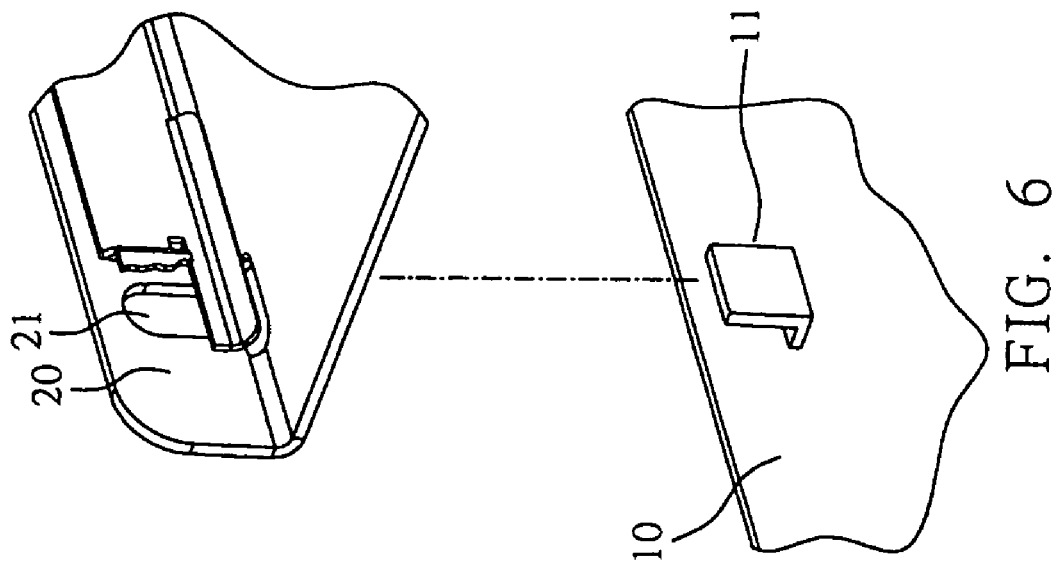
FIG. 5 is a structural drawing of a support mechanism for storage drives according to another embodiment of the present invention.

For expressing another embodiment of the present invention, FIG. 5 shows a schematic diagram of another embodiment. The fixing component 11 is a resilient component and a plurality of fixing components can be attached to the case 10. When the frame 20 is attached to the case 10, the fixing slots 21 on the frame 20 are aligned with the fixing components 11 and then the fixing components 11 are fixed in the fixing slots 21. Afterwards, the screwing component is screwed and fastened on the supporting element. Consequently, the frame 20 is fixed on the case 10 and is not easily detached because of vibration or shaking.

Figure 6:
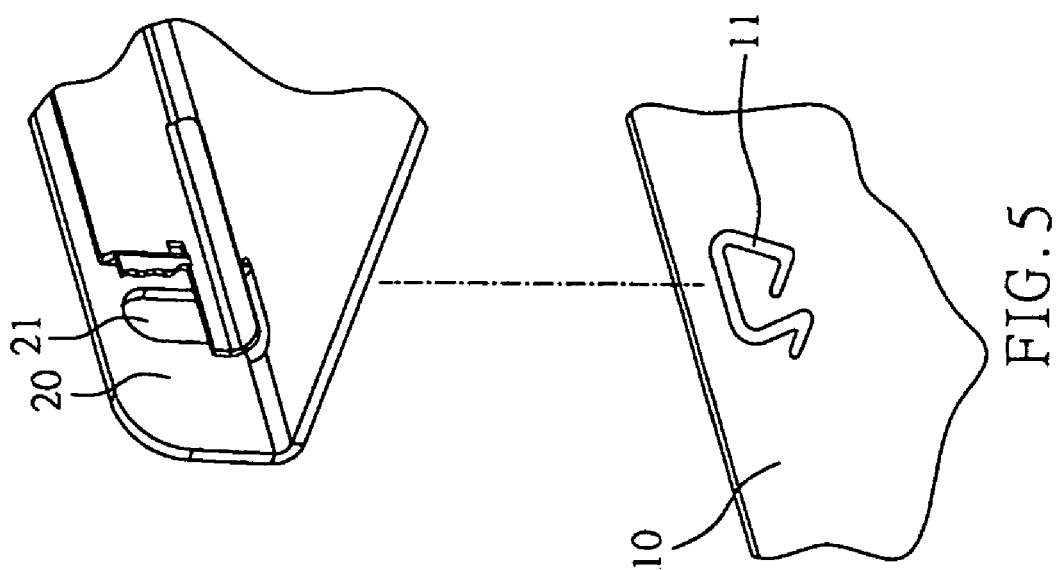
FIG. 6 is a structural drawing of a support mechanism for storage drives according to another embodiment of the present invention.
Figure 7:
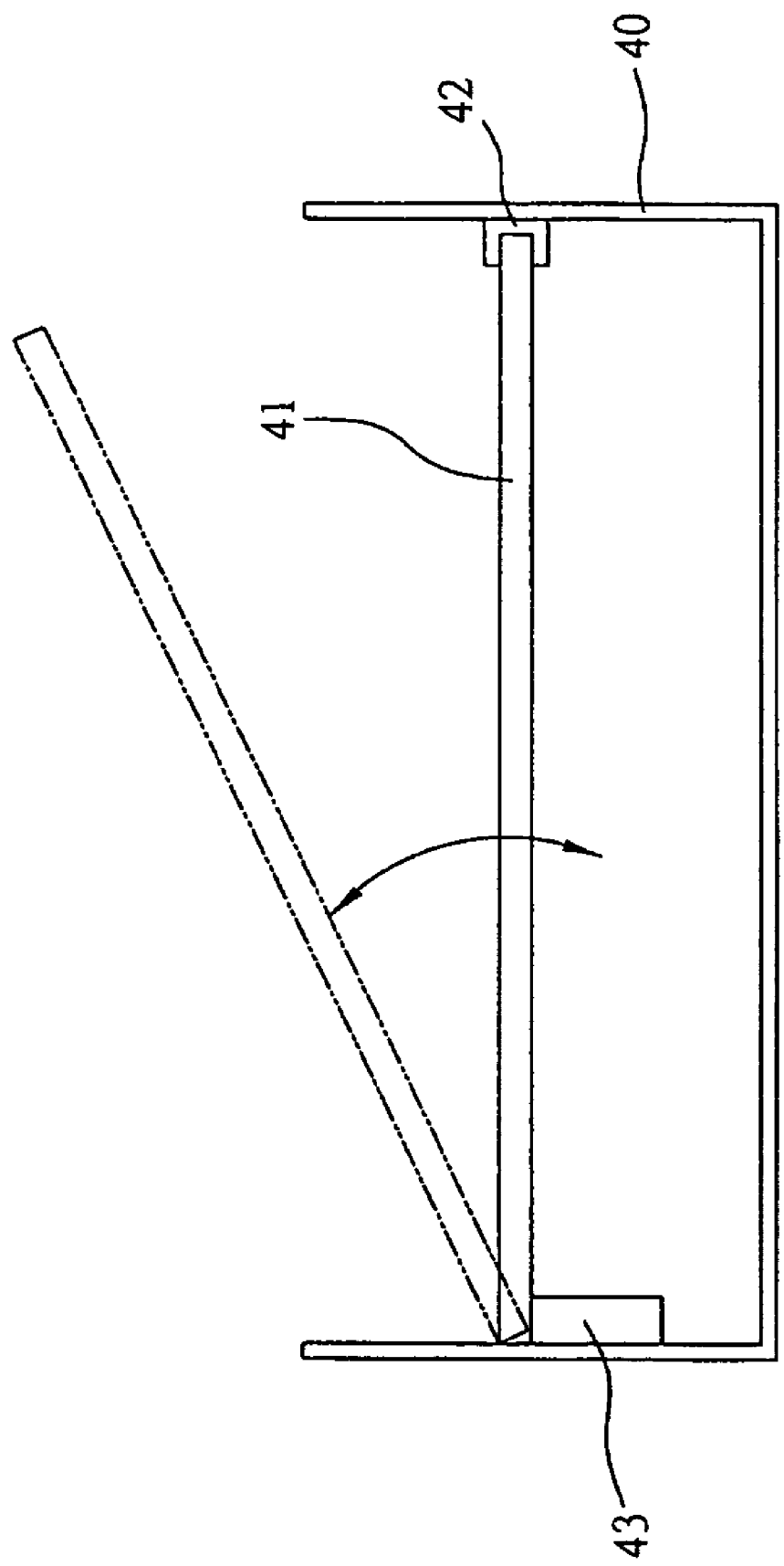
FIG. 7 is a structural drawing of a conventional support mechanism for a storage drive.

Furthermore, FIG. 6 shows schematic diagram of still another embodiment of the present invention. The fixing component 11 is an L-shaped latch and a plurality of latches can be affixed on the case 10. When the frame 20 is attached, the fixing slots 21 on the frame 20 are aligned with the fixing components 11. Then, as the frame 20 is disposed in the case 10, the fixing components 11 are fixed in the fixing slots 21. Afterwards, the screwing component is screwed and fastened on the supporting element. Consequently, the frame 20 is fixed on the case 10 and is not detached easily due to vibration or shaking.

As described above, the supporting mechanism for a hard disk drive of the present invention includes a plurality of fixing components disposed on the sides of a case. The fixing components can be axial fixing components, resilient components, latches, or screws. A frame equipped with fixing slots corresponding to the fixing components is provided to support storage drives. The remaining structure of the frame embodies simplicity for ease of manufacturing, and the fixing components and the fixing pieces can be operated by hand, therefore allowing the frame to be easily attached and detached. Furthermore, the fixing components, the fixing pieces, and the screwing component disposed on the frame or case have small volume, thereby leaving room for other components.

Although, the foregoing embodiments were chosen and described in order to best explain the principles of the invention and its practical application, they are not intended to limit the scope of the present invention in any way, but rather to enable others skilled in the art to best understand and utilize the invention and various embodiments with various modifications as are suited to the particular use contemplated. It is intended that the scope of the invention be defined by the Claims appended hereto and their equivalents.

What is claimed is:

1. A supporting mechanism for storage drives disposed on a case of an electronic device, the supporting mechanism comprises at least:

a plurality of fixing components disposed on the case;

a frame with a plurality of fixing slots located on two sides of the frame corresponding to the fixing components, wherein the frame is fixed to the case on two sides by the engagement of the fixing slots with the corresponding fixing components;

two or more fixing pieces disposed on each of the two sides of the frame in contact with the case;

a supporting element disposed on a center region of the case; and a screwing component, wherein the frame is fixed on the case by screwing the screwing component together with the supporting element;

wherein each of the fixing components is selected from the group consisting of an axial fixing component, an elastic component, a latch and a screw.

2. The supporting mechanism for storage drives as claimed in claim 1, wherein the axial fixing component is fixed on a side of the case by a nut.

3. The supporting mechanism for storage drives as claimed in claim 1, wherein each of the fixing pieces is a resilient component.

4. The supporting mechanism for storage drives as claimed in claim 3, wherein the resilient component is a sheet spring.

5. The supporting mechanism for storage drives as claimed in claim 1, wherein each of the fixing pieces further comprises a blocking sheet.

6. The supporting mechanism for storage drives as claimed in claim 1, wherein the screwing component is a thumbscrew.

7. The supporting mechanism for storage drives as claimed in claim 1, wherein the case is a motherboard of a computer such that the frame supporting the storage drives is attached to the motherboard.

* * * * *